United States Patent
Rendusara

(10) Patent No.: US 10,221,679 B2
(45) Date of Patent: Mar. 5, 2019

(54) REDUCING COMMON MODE NOISE WITH RESPECT TO TELEMETRY EQUIPMENT USED FOR MONITORING DOWNHOLE PARAMETERS

(71) Applicant: Schlumberger Technology Corporation, Sugar Land, TX (US)

(72) Inventor: Dudi Rendusara, Woodlands (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/513,919

(22) PCT Filed: Sep. 21, 2015

(86) PCT No.: PCT/US2015/051196
§ 371 (c)(1),
(2) Date: Mar. 23, 2017

(87) PCT Pub. No.: WO2016/048881
PCT Pub. Date: Mar. 31, 2016

(65) Prior Publication Data
US 2017/0260851 A1  Sep. 14, 2017

Related U.S. Application Data

(60) Provisional application No. 62/055,754, filed on Sep. 26, 2014.

(51) Int. Cl.
*G01V 3/00* (2006.01)
*E21B 47/12* (2012.01)
(Continued)

(52) U.S. Cl.
CPC ............ *E21B 47/12* (2013.01); *E21B 43/128* (2013.01); *F04D 13/10* (2013.01); *H04B 3/54* (2013.01);
(Continued)

(58) Field of Classification Search
CPC ......... E21B 47/12; E21B 43/128; H04B 3/54; H04B 2203/5466; H04B 2203/5475
(Continued)

(56) References Cited

U.S. PATENT DOCUMENTS 4,631,536 A    12/1986   Ward et al.
5,257,006 A *  10/1993   Graham ................ H04B 3/54
                                                     307/11

(Continued)

FOREIGN PATENT DOCUMENTS

GB      2431081 A       4/2007
WO   2008102170 A1     8/2008
(Continued)

OTHER PUBLICATIONS

International Preliminary Report on Patentability for corresponding PCT Application Serial No. PCT/US2015/051196, dated Mar. 28, 2017, 10 pages.

*Primary Examiner* — Zhen Y Wu

(57) ABSTRACT

A system and methodology are provided for improving telemetry over a three-phase electrical power cable of the type used to provide power to electric submersible pumping systems or other powered devices. Data communication is provided between one end of a three-phase electrical power cable coupled with an electric power source and the other end of the three-phase electrical power cable coupled to a powered device, such as an electrical motor. The system and methodology enable a reduction in the level of common mode noise generated by, for example, a variable speed drive and/or enable minimizing or eliminating the common mode noise before mixing with data communication signals.

18 Claims, 6 Drawing Sheets

(51) Int. Cl.
　　*F04D 13/10* 　　(2006.01)
　　*E21B 43/12* 　　(2006.01)
　　*H04B 3/54* 　　(2006.01)

(52) U.S. Cl.
　　CPC ............ *H04B 2203/5466* (2013.01); *H04B 2203/5475* (2013.01)

(58) Field of Classification Search
　　USPC ...................................................... 340/854.5
　　See application file for complete search history.

(56) References Cited

U.S. PATENT DOCUMENTS

| | | | |
|---|---|---|---|
| 5,515,038 A | 5/1996 | Smith | |
| 5,521,592 A | 5/1996 | Veneruso | |
| 5,539,375 A | 7/1996 | Atherton | |
| 5,646,498 A * | 7/1997 | Lipo | H02M 1/12 318/800 |
| 5,736,910 A | 4/1998 | Townsend et al. | |
| 5,844,949 A | 12/1998 | Hershey et al. | |
| 6,188,552 B1 * | 2/2001 | Jaeschke | E21B 43/128 361/111 |
| 6,329,905 B1 | 12/2001 | Cunningham | |
| 6,396,415 B1 | 5/2002 | Bulmer | |
| 6,407,987 B1 | 6/2002 | Abraham | |
| 6,587,037 B1 | 7/2003 | Besser et al. | |
| 7,268,670 B2 | 9/2007 | Robertson | |
| 7,982,633 B2 | 7/2011 | Booker et al. | |
| 9,362,839 B2 * | 6/2016 | Wei | H02M 5/4585 |
| 2003/0095036 A1 * | 5/2003 | Wasaki | H04B 3/56 375/257 |
| 2004/0130923 A1 * | 7/2004 | Yin Ho | H02M 1/44 363/131 |
| 2004/0246751 A1 * | 12/2004 | Honda | H02M 1/12 363/39 |
| 2006/0140260 A1 * | 6/2006 | Wasaki | H04B 3/56 375/219 |
| 2006/0227483 A1 * | 10/2006 | Akagi | H02M 1/12 361/118 |
| 2007/0138971 A1 * | 6/2007 | Chen | H05B 39/045 315/209 R |
| 2007/0268052 A1 * | 11/2007 | Yin | H02M 1/12 327/175 |
| 2008/0174255 A1 * | 7/2008 | Schnetzka | F25B 49/025 318/12 |
| 2008/0272932 A1 | 11/2008 | Booker et al. | |
| 2009/0021393 A1 * | 1/2009 | Layton | G01V 11/002 340/854.9 |
| 2009/0065197 A1 * | 3/2009 | Eslinger | E21B 43/003 166/249 |
| 2009/0109713 A1 * | 4/2009 | Schnetzka | H02M 5/4585 363/34 |
| 2014/0063872 A1 * | 3/2014 | Hamza | H02M 1/44 363/39 |
| 2014/0077966 A1 | 3/2014 | Robertson et al. | |
| 2014/0112042 A1 * | 4/2014 | Lee | H01F 27/29 363/125 |
| 2014/0166268 A1 * | 6/2014 | Weightman | E21B 47/06 166/250.01 |
| 2017/0058653 A1 * | 3/2017 | Gupta | E21B 43/128 |
| 2017/0089192 A1 * | 3/2017 | Rendusara | E21B 43/128 |

FOREIGN PATENT DOCUMENTS

| | | |
|---|---|---|
| WO | WO2013132231 A1 | 9/2013 |
| WO | WO2014120847 A1 | 8/2014 |

* cited by examiner

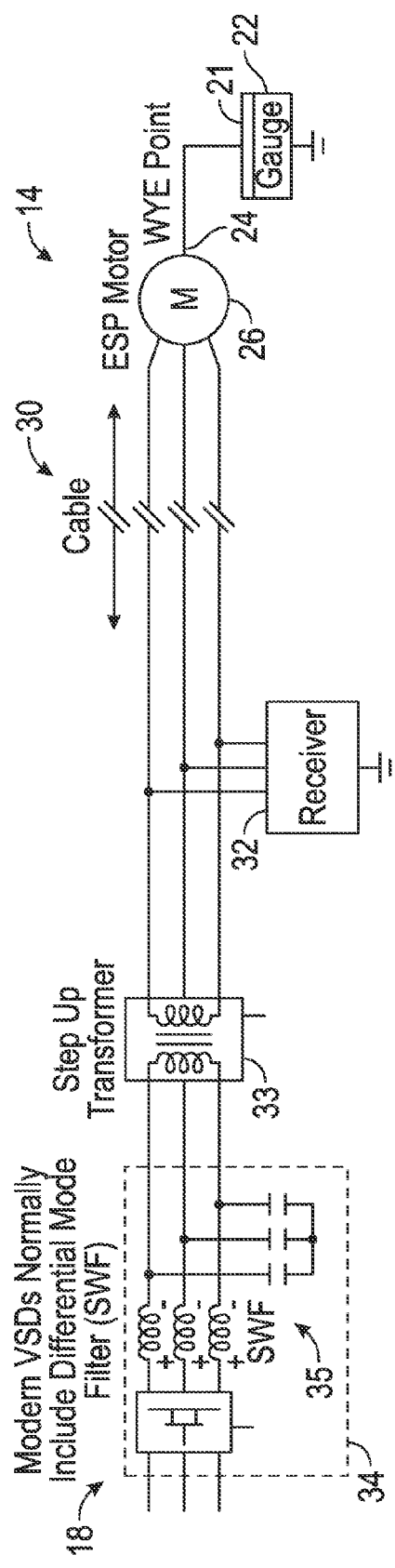
FIG. 2
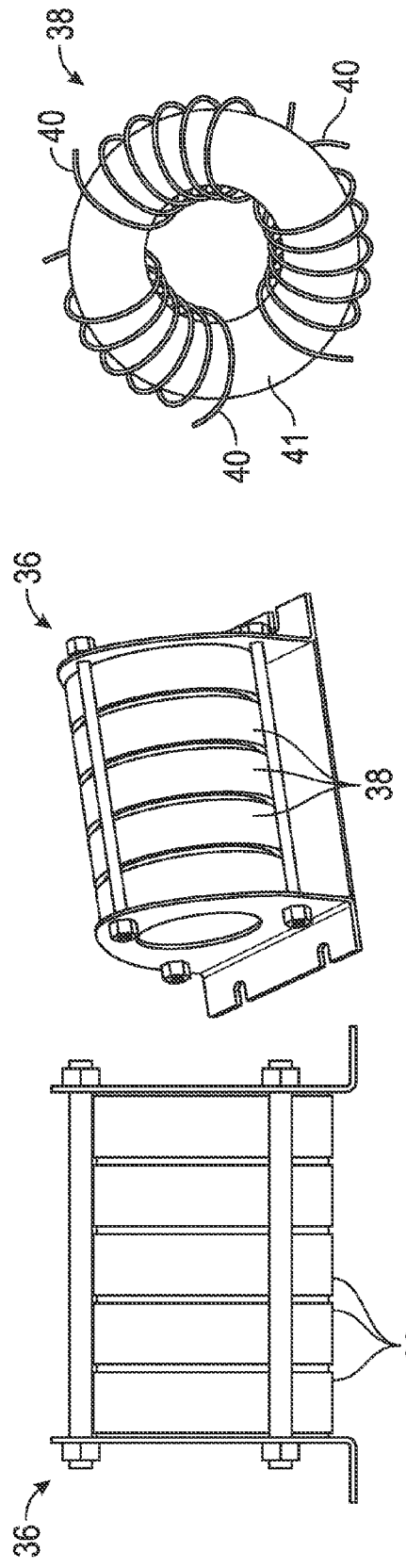
FIG. 3
FIG. 4

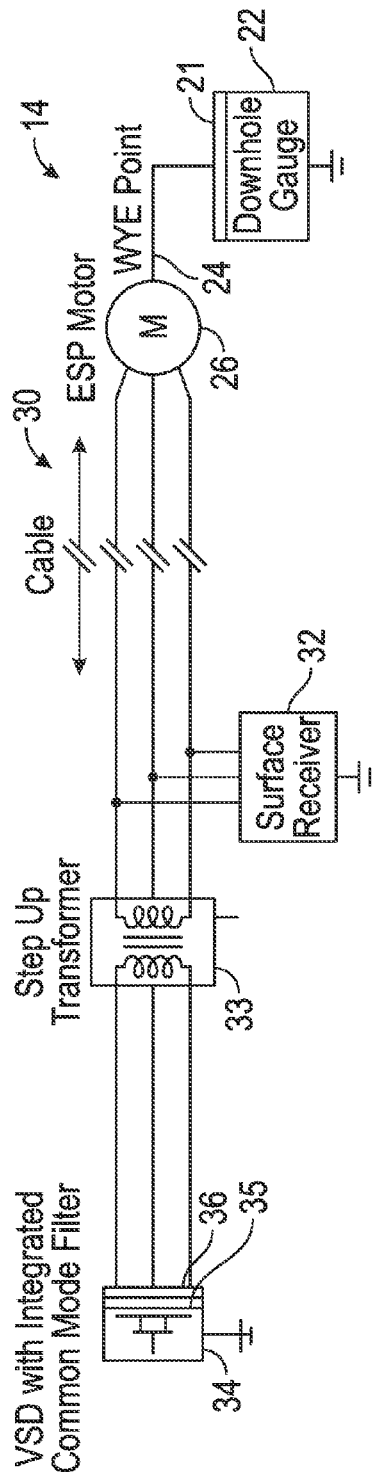
FIG. 7
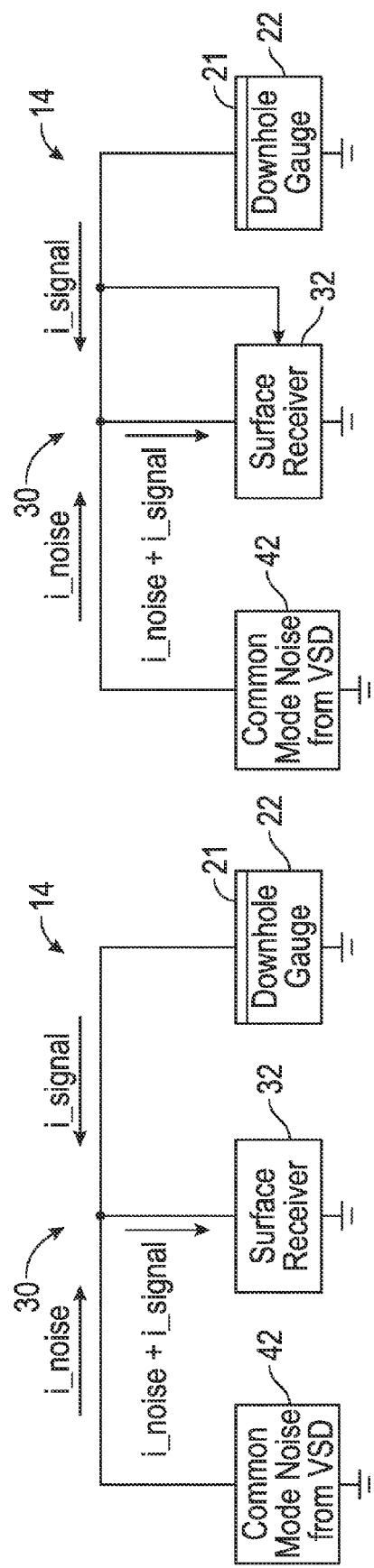
FIG. 9
FIG. 8

REDUCING COMMON MODE NOISE WITH RESPECT TO TELEMETRY EQUIPMENT USED FOR MONITORING DOWNHOLE PARAMETERS

CROSS-REFERENCE TO RELATED APPLICATION

The present document is based on and claims priority to U.S. Provisional Application Ser. No. 62/055,754 filed Sep. 26, 2014, which is incorporated herein by reference in its entirety.

BACKGROUND

Electric submersible pumping systems are employed in a variety of well applications. In some applications, telemetry systems provide data communication with the electric submersible pumping system over a power cable. Various communication systems have been employed for communicating telemetry signals that represent physical parameters measured by sensors within the wellbore. Some of these telemetry systems are able to transmit the telemetry signals over a three-phase power cable used for powering the electric submersible pumping system. However, existing systems have a variety of limitations, including intolerance to ground faults, limitations on data transfer rates due to use of large isolation chokes on the surface and in the downhole environment, and difficulty of operation in noisy environments.

SUMMARY

In general, a system and methodology are provided for improving telemetry over a three-phase electrical power cable of the type used to provide power to electric submersible pumping systems or other powered devices. Data communication is provided between one end of a three-phase electrical power cable coupled with an electrical power source and the other end of the three-phase electrical power cable coupled to a powered device, such as an electrical motor. The system and methodology enable a reduction in the level of common mode noise generated by, for example, a variable speed drive and/or enable minimizing or eliminating the common mode noise coupling at a point of measurement.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 2 is a block diagram of an example of an electric submersible pumping system installation positioned in relation to a downhole sensor unit and a surface installation, according to an embodiment of the disclosure;

FIG. 3 is an illustration of examples of common mode filters which may be used in a variable speed drive associated with, for example, an electric submersible pumping system, according to an embodiment of the disclosure;

FIG. 4 is a schematic illustration of an example of a winding configuration of three-phase common mode cores which can be used to filter common mode noise and to thus enhance data telemetry, according to an embodiment of the disclosure;

FIG. 7 is a schematic illustration of an example of an electric submersible pumping system installation having a common mode filter as an integral part of a variable speed drive, according to an embodiment of the disclosure;

FIG. 8 is a schematic illustration of an example of an electric submersible pumping system installation shown with respect to an earth ground (common mode point), according to an embodiment of the disclosure;

FIG. 9 is a schematic illustration of an example of a system in which the signal current is measured at an appropriate location before signal current mixes with noise current, according to an embodiment of the disclosure;

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The present disclosure generally relates to a system and methodology for improving telemetry over a three-phase electrical power cable of the type used to provide power to electric submersible pumping systems or other powered devices. Data communication is provided between one end of a three-phase electrical power cable coupled with an electrical power source, e.g. a variable speed drive, and the other end of the three-phase electrical power cable coupled to a powered device, e.g. an electric motor. In electric submersible pumping systems applications, for example, a variable speed drive may be coupled to the power cable at one end and an electric submersible motor at the other end. Data signals from various downhole sensors may be transmitted along the three-phase power cable. The system and methodology enable a reduction in the level of common mode noise generated by, for example, the variable speed drive and/or enable minimizing or eliminating the common mode noise coupling at a point of measurement. In well applications, the embodiments described herein enable a method for reducing common mode noise with respect to telemetry equipment used for monitoring downhole parameters, e.g. parameters related to an electric submersible pumping system. It should be noted the common mode noise reduction technique may be used with a variety of drives, including low voltage drives and medium voltage drives.

Figure 1:
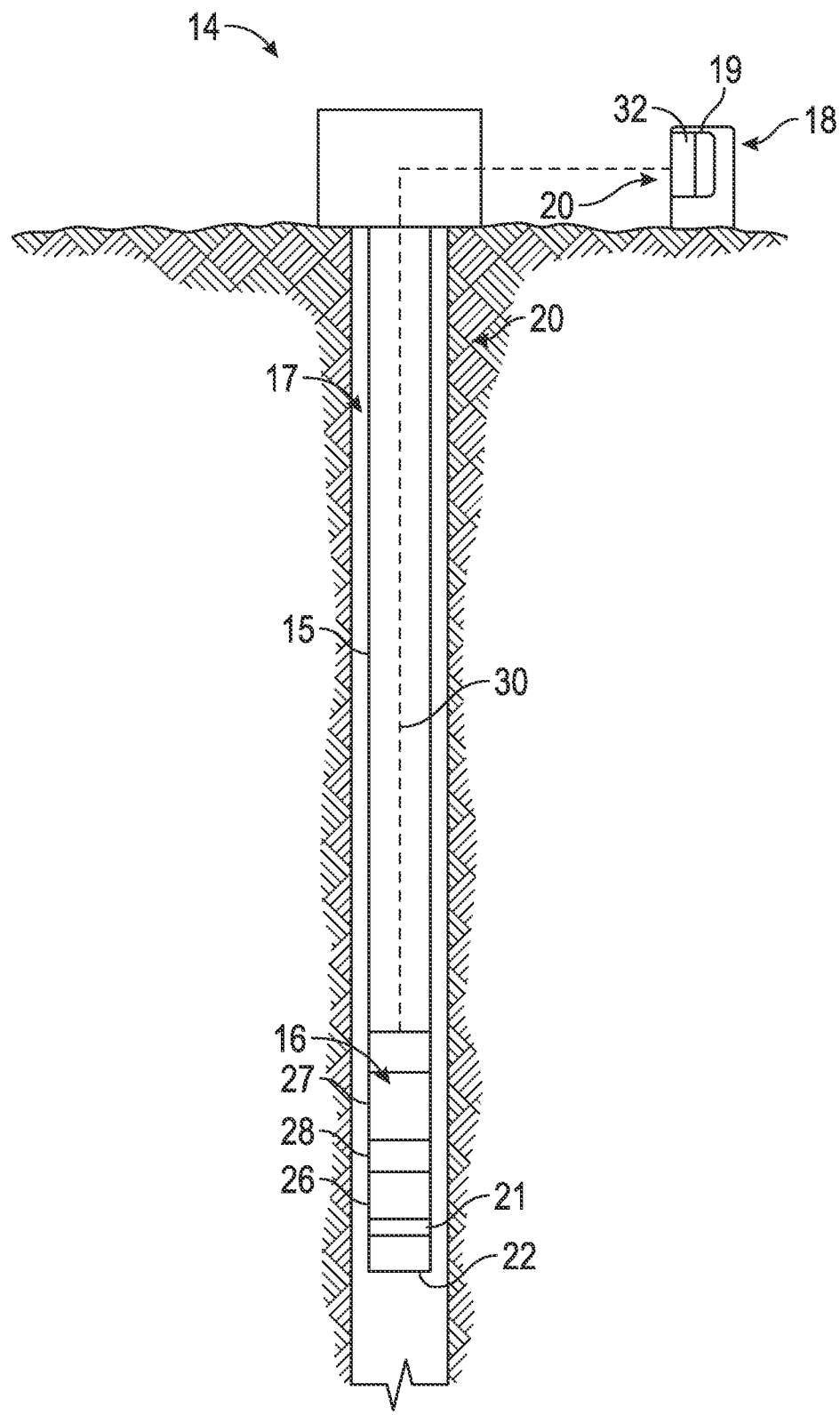
FIG. 1 is a schematic illustration of an electric submersible pumping system installation positioned in a wellbore and comprising an example of a telemetry system, according to an embodiment of the disclosure.

Referring generally to FIG. 1, an embodiment of a well system 14 is illustrated. In this example, the well system 14 comprises a well string 15 having an electrically powered unit 16, e.g. an electric submersible pumping system, deployed in a wellbore 17. Electrical power is provided to the powered unit 16 by a power source 18 which may be in the form of a variable speed drive (VSD) located at, for example, the surface. The power source/VSD 18 may comprise or may be coupled with a control system 19 used to, for example, control electrical power delivery downhole and/or to receive data from various downhole sensors and/or other sensors, as described in greater detail below. Data may be communicated along the wellbore by a suitable data communication or telemetry system 20, such as electromagnetic-based telemetry system or other suitable telemetry system. By way of example, the telemetry system 20 may comprise a downhole transceiver 21 used to deliver data signals up hole to the control system 19, e.g. a surface located control system.

The technique described herein may be used to facilitate data communication along a three-phase power cable. In certain well applications, data communication is improved between one end of the three-phase electrical power cable, e.g. the end coupled to the electrical power source 18 located uphole (at surface), and the other end of the power cable, e.g. the end coupled to powered system 16 installed downhole. Referring to both FIG. 1 and FIG. 2, an embodiment of system 14 is illustrated with various examples of components. In general, the embodiment illustrates basics of a system in which high frequency data is generated by a downhole unit 22 (e.g. a gauge/sensor unit) and transmitted up hole via downhole transceiver 21 of data communication system 20. In some applications, the downhole transceiver 21 may be part of the downhole sensor unit 22. Additionally, the downhole sensor unit 22 may be coupled at a Wye point 24 to a downhole motor 26, e.g. an electric submersible motor of the electric submersible pumping system 16. Depending on the application, the electric submersible pumping system 16 may comprise various components, such as a submersible pump 27 and a motor protector 28.

In some applications, downhole sensor unit 22 may be coupled with the downhole motor 26 by a transformer, capacitor, combination of transformer and capacitor, or other suitable electronics. Additionally, the downhole sensor unit 22 may be powered by a DC current/voltage supplied from the surface and/or by AC current/voltage at Wye point 24 of downhole motor 26 in case of phase-to-fault ground in power cable 30. The power cable 30 may comprise a three-phase power cable routed from the power source 18 to the powered system 16, e.g. to downhole motor 26. Data communication may be conducted along power cable 30 via data communication system 20, and the data communication may be maintained in the event of a ground fault on the power cable 30.

In the example illustrated, a step up transformer 33 is connected along power cable 30 between the surface power source 18 and the surface receiver 32. In the illustrated embodiment, the surface power source 18 comprises a variable speed drive 34, such as the variable speed drive that may be used to provide electrical power to the motor 26 of the electric submersible pumping system 16. However, the quality and success of data communication can be affected by the level of electrical noise present at a surface receiver 32. For example, a pulse width modulation (PWM) drive may be used in the variable speed drive, but this type of power source 18 generates substantial electrical noise that can easily corrupt data communication signals even in the presence of low pass filters found in some variable speed drives.

Variable speed drives 34 tend to generate two types of electrical noise: differential mode noise and common mode noise. Differential mode noise is defined as noise generated by the VSD output between phase to phase of the three-phase power system. The common mode noise is defined as electrical noise generated between the phases to the earth ground. In the example illustrated in FIG. 2, the variable speed drive 34 comprises a differential mode filter 35 which filters out differential mode noise generated by the VSD 34. However, the overall system 14 also is configured for combination with common mode noise filters, such as the common mode filters illustrated in FIGS. 3 and 4 and explained in greater detail below.

The conventional low pass filters inside various installed VSDs in some ESP installations today include filters for differential mode noise, but not for common mode noise. In FIG. 2, a schematic diagram of an ESP system installation is illustrated in relation to the downhole sensor unit 22 and surface installations. As illustrated, the downhole sensor unit 22 and surface receiver 32 of telemetry system 20 are installed with respect to the earth ground making the telemetry more vulnerable to common mode noise rather than to differential mode noise generated by variable speed drive 34. The system and methodology described herein reduce the level of common mode noise generated by the VSD 34 and/or also minimize or eliminate the common mode noise coupling at the point of measurement. At least portions of the data communication system 20 may incorporate components described in U.S. Pat. No. 7,982,633 to facilitate communication of signals along a three-phase electrical power cable.

According to embodiments, an improved communication system 20 is provided for use in downhole applications wherein electrical energy is supplied over a multiple conductor power cable 30 (multi-phase, e.g. three-phase, power cable) to an ESP motor assembly, e.g. to downhole motor 26. The downhole sensor unit 22 may be AC-coupled to the multiple conductor power cable 30 through the wye point 24 of the ESP motor 26. A surface unit, e.g. surface receiver 32, also may be AC-coupled to the multiple conductor power cable 30. Uplink communication of telemetry data occurs over an AC communication scheme supported by the transceiver 21 and associated electronics of downhole sensor unit 22 and surface telemetry unit 32. Downlink communication of command data (for remote control purposes) occurs over a different AC communication scheme supported by the surface unit 32 and the downhole sensor unit 22. These AC communication schemes provide an independent supply of power to the downhole unit 22.

Figure 5:
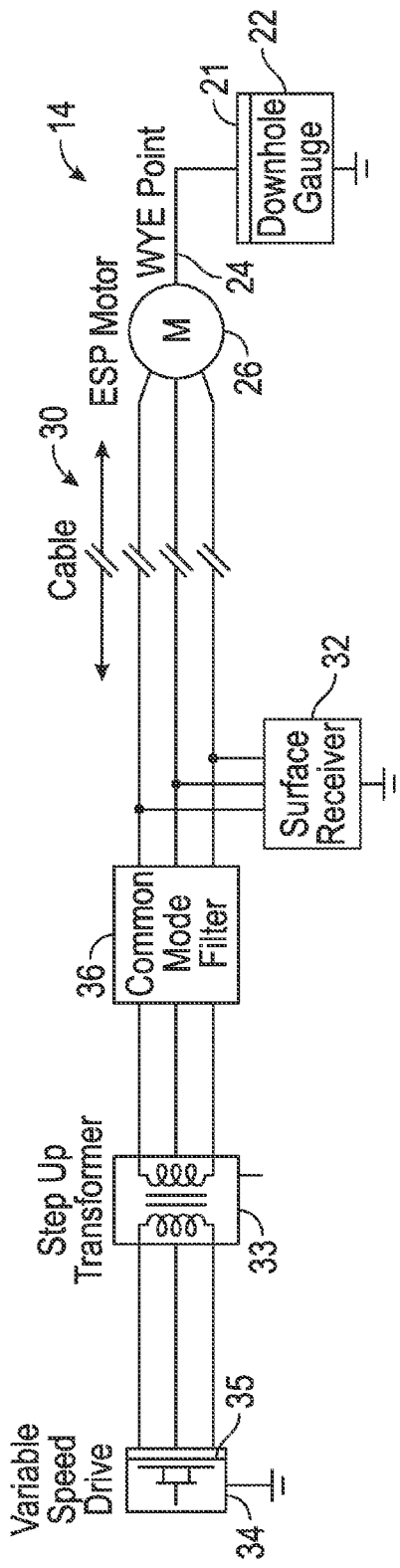
FIG. 5 is a schematic illustration of an example of an electric submersible pumping system installation having a common mode filter at a secondary side of a transformer, according to an embodiment of the disclosure.

The techniques described herein reduce the level of common mode noise affecting the data communication or the telemetry signal at the surface receiver 32. According to an embodiment, the technique facilitates filtering out or decreasing common mode noise from the variable speed drive 34 and limits the effects on telemetry signals at the surface receiver 32 by installing a three-phase common mode filter 36 (see FIGS. 3 and 4). The common mode filter 36 can be installed at the secondary side of the step up transformer 33 (see FIG. 5), at the primary side of the step-up transformer 33 (see FIG. 6), or the common mode filter 36 can be an integral part of the variable speed drive 34 (see FIG. 7).

Referring again to FIGS. 3 and 4, the common mode filter 36 may be made by winding three wires into a single or multiple stack of toroidal cores 38. By way of example, the toroidal cores 38 may be made of high frequency ferrite materials. In this embodiment, three phase wires 40 may be wound in a common segment or separate segments of a common mode core assembly 41 as shown in FIG. 4. The winding direction of each winding segment may be unidirectional so as to maximize the self magnetizing inductance generated by the common mode noise while cancelling the self magnetizing inductance generated by the three phase motor currents (phase A, B, and C).

Figure 6:
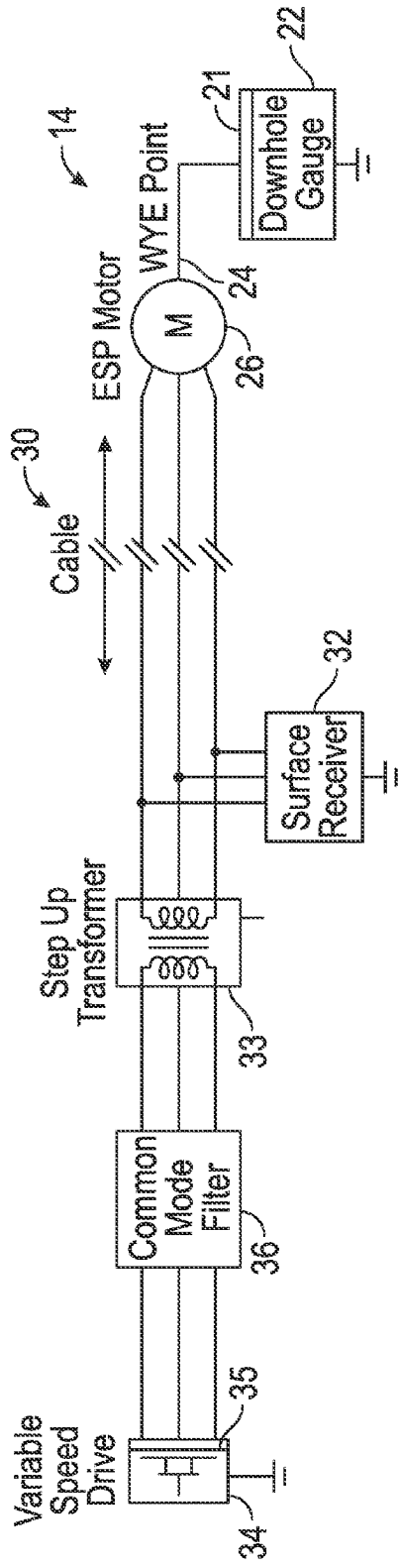
FIG. 6 is a schematic illustration of an example of an electric submersible pumping system installation having a common mode filter at a primary side of a transformer, according to an embodiment of the disclosure.

Referring again to FIG. 5, an embodiment is illustrated in which the common mode filter 36 is installed at a secondary side of the transformer 33. In another example, the common mode filter 36 may be installed at a primary side of the transformer 33, as illustrated in FIG. 6. However, the common mode filter 36 also may be installed as an integral part of the variable speed drive 34, as illustrated in FIG. 7. Accordingly, the common mode filter 36 may be integrated into the system at a plurality of locations depending on the parameters of a given application. In each of these locations, the common mode filter serves to reduce common mode noise generated by variable speed drive 34.

According to another embodiment, the technique may be carried out by taking appropriate measures at a selected location such that common mode noise may be reduced or removed before the common mode noise is coupled to the signal. In FIG. 8, a block diagram illustrates an embodiment of electric submersible pumping system 16 with respect to the common mode point (earth ground). The system is exposed to common mode noise from the VSD 34, as represented by diagram block 42. The downhole sensor unit 22 and the surface receiver 32 are installed with respect to the earth ground, thus making the received telemetry signal at the surface receiver 32 vulnerable to common mode noise (see block 42). For example, the signal may be vulnerable at the point where the surface receiver 32 measures the telemetry signal transmitted from downhole sensor unit 22 via telemetry system 20.

However, this vulnerability can be reduced or removed by measuring the telemetry signal at a point before the signal current is mixed/affected by the noise current, as illustrated diagrammatically in FIG. 9. In the example illustrated in FIG. 9, the signal current is measured at an appropriate location before the signal current mixes with the noise current. This can be accomplished by installing a current transducer or transformer at the three-phase power cable 30, as described in greater detail below. By measuring and addressing the signal current at such a location, measures may be taken to reduce the effects of common mode noise.

Figure 10:
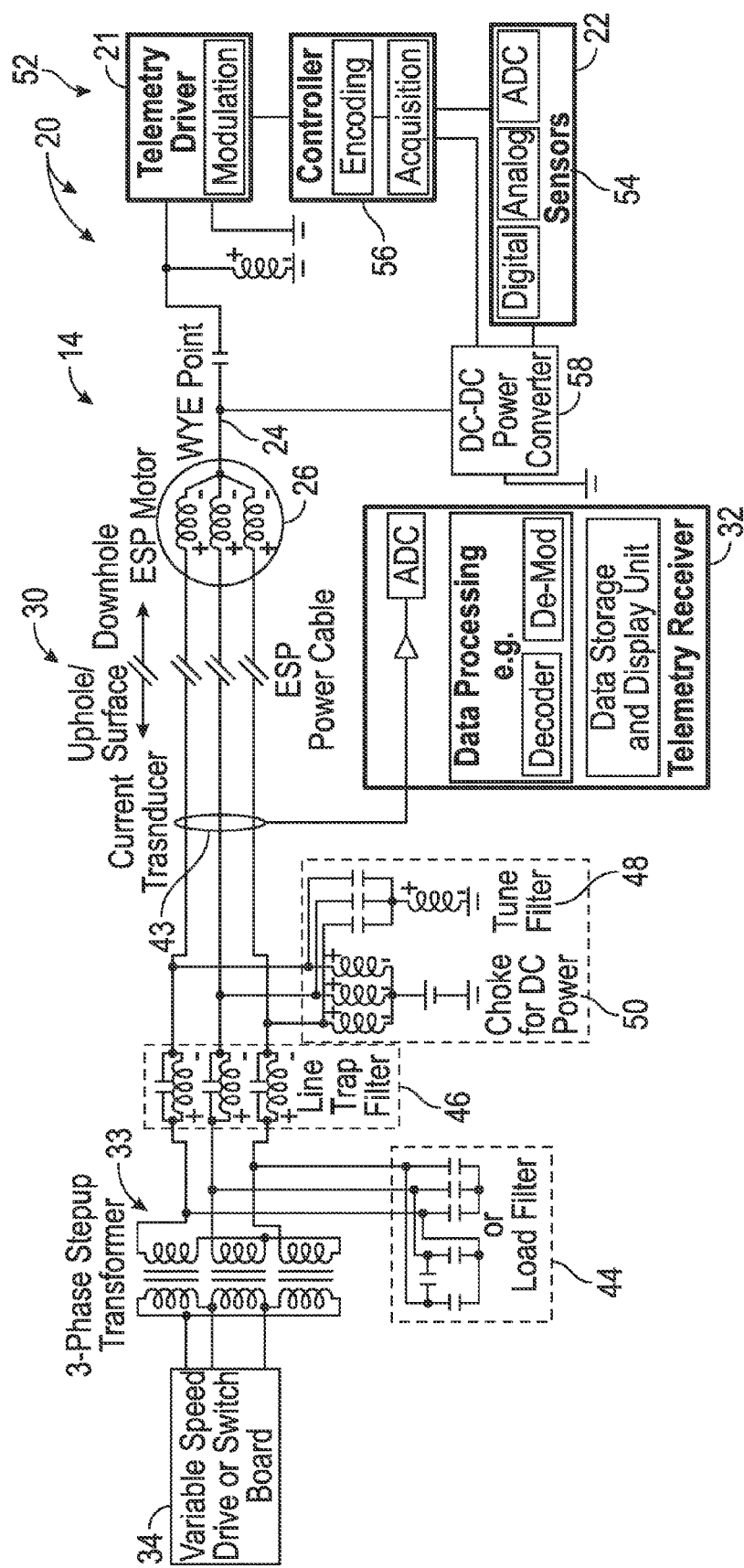
FIG. 10 is a schematic illustration of an example of a system in which three-phase wires are placed inside a single current transducer having its output connected to a signal filter system, according to an embodiment of the disclosure.

An example is illustrated in FIG. 10 in which the three-phase wires of cable 30 are placed inside a single current transducer 43 coupled with telemetry receiver 32. The output of single current transducer 43 also may be connected to various signal processing electronics, such as a high pass filter and a bandpass filter. The placement of single current transducer 43 thus allows the effects of common mode noise to be filtered or otherwise addressed before contaminating the data signals.

Depending on the application, suitable electronics also may be used to perform a variety of desired data signal filtering along power cable 30. According to an example, signal filtering may be accomplished by a load filter 44, a line trap filter 46, and a tune filter 48 combined with a choke for DC power 50. It should be noted that the receiver 32 also may comprise a variety of electronics, such as a data storage and display unit, data processing unit, current converters, and/or other electronics to facilitate receipt and processing of data signals communicated along power cable 30 from, for example, the downhole sensor unit 22. Depending on the application, the line trap filter or filters 46 also can be used to block common mode noise with proper tuning to the telemetry frequencies. When tuned to the proper bandwidth, the line trap filter(s) 46 helps block the in-band noise generated by the drive, e.g. variable speed drive 34.

By placing all three wires of cable 30 inside the same transducer 43, the sum of the magnetic fields of the three-phase currents adds to zero (due to the 120° phase shifts with respect to each other). This makes it easier to measure the higher frequency telemetry signal. Appropriate circuitry 52 also may be combined with gauge/sensor unit 22 to facilitate the output of a suitable signal. For example, the downhole sensor unit 22 may comprise telemetry transceiver 21 and one or more sensors 54 selected for sensing of a corresponding downhole parameter or parameters. Depending on the application, the downhole sensor unit 22 also may comprise a controller 56 for acquiring and encoding data. The sensor unit 22 also may comprise a power converter 58 and/or other signal handling/processing electronics to facilitate transmission of data along power cable 30 via telemetry system 20.

Figure 11:
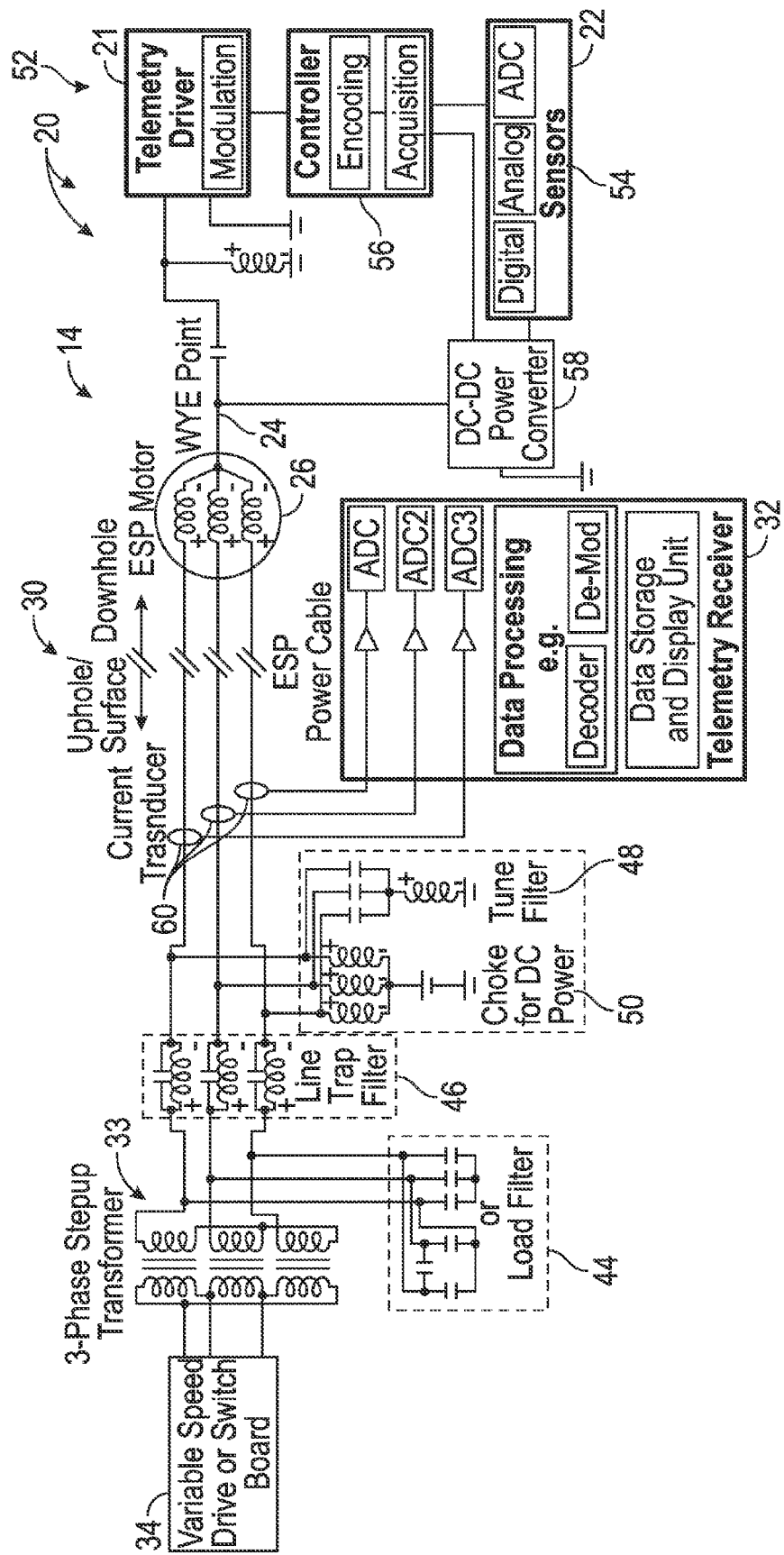
FIG. 11 is a schematic illustration similar to that of FIG. 10 but showing an example of a system in which three current transducers are installed and each current transducer is associated with each phase, according to an embodiment of the disclosure.

Referring generally to FIG. 11, another embodiment is illustrated in which three current transducers 60 are installed along power cable 30 and coupled with surface telemetry receiver 32. In this example, each current transducer 60 is associated with a corresponding phase of power cable 30. This approach facilitates determining which phase experiences a ground fault to ground and/or determining the amount of current imbalance between phases. This latter embodiment further facilitates performance of other diagnostics with respect to the health of the downhole electric submersible pumping system (or other powered system) by analyzing the frequency components of the electric submersible pumping system motor phase currents. As with the embodiment illustrated in FIG. 10, various filters may be disposed along power cable 30. Additionally, the telemetry receiver 32 may comprise suitable electronics for storing and processing signals obtaining cooperation with current transducer 60. Depending on the application, the downhole sensor unit 22 also may comprise various sensors 54 and electronics to facilitate detection and monitoring of the desired downhole parameter or parameters.

It should be noted the various common mode noise filters and/or filtering techniques described herein often are combined with differential mode filter 35 and/or other differential mode filters/techniques. Depending on the application, the various embodiments of system 14 described herein may be constructed in several sizes and several types of configurations for use with various types of motors and other powered devices. Similarly, other and/or additional components may be incorporated into the overall system 14. Modifications and changes in configuration also may be made with respect to the individual components, e.g. VSDs, sensors/gauges, surface receivers, filters, supporting circuitry, and/or other components of the overall system. For example, low-voltage drives may be used in combination with the step up transformer 33, but some applications may utilize medium voltage drives without the step up transformer. The common mode noise reduction techniques described herein are suitable for a variety of applications utilizing the medium voltage drives.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method of data communication, comprising:
    coupling a three-phase electrical power cable between an electrical power source located at a surface location and an electric motor positioned in an electric submersible pumping system deployed in a wellbore;
    communicating, via a telemetry system, data signals along the three-phase electrical power cable; and
    installing a common mode filter in combination with a transformer along the three-phase electrical power cable to reduce a level of both differential mode noise and common mode noise on the three-phase electrical power cable from the electrical power source to enhance communication of the data signals by reducing corruption of the data signals.

2. The method as recited in claim 1, further comprising forming the common mode filter by winding three wires into a single or multiple stack of toroidal cores.

3. The method as recited in claim 1, wherein installing comprises installing the common mode filter at a secondary side of the transformer between the transformer and the electric motor.

4. The method as recited in claim 1, wherein installing comprises installing the common mode filter at a primary side of the transformer between the electric power source and the transformer.

5. The method as recited in claim 1, wherein installing comprises installing the common mode filter as an integral part of the electric power source in the form of a variable speed drive.

6. The method as recited in claim 1, wherein reducing comprises measuring a signal current at an appropriate location before the signal current mixes with a noise current.

7. The method as recited in claim 1, wherein coupling comprises coupling the three-phase electrical power cable between the electric power source in the form of a variable speed drive.

8. A system, comprising:
    a well string deployed in a wellbore;
    an electric motor deployed along the well string;
    a variable speed drive located at a surface location;
    a three-phase power cable coupled between the variable speed drive and the electric motor to provide electric power to the electric motor;
    a downhole sensor unit;
    a surface receiver;
    a telemetry system for communicating data signals along the three-phase power cable between the downhole sensor unit and the surface receiver; and
    a filter system comprising a common mode filter in combination with a step-up transformer along the three-phase power cable, the filter system filtering both differential mode noise and common mode noise generated by the variable speed drive to reduce corruption of the data signals conveyed by the telemetry system.

9. The system as recited in claim 8, wherein the filter system comprises a filter coupled with the variable speed drive to reduce differential mode noise.

10. The system as recited in claim 8, wherein the common mode filter comprises three-phase wires wound into a single toroidal core.

11. The system as recited in claim 8, wherein the common mode filter comprises three-phase wires wound into a stack of toroidal cores.

12. The system as recited in claim 8, wherein the common mode filter is installed on a secondary side of the step-up transformer between the step-up transformer and the electric motor.

13. The system as recited in claim 8, wherein the common mode filter is installed on a primary side of the step-up transformer between the variable speed drive and the step-up transformer.

14. The system as recited in claim 8, wherein the effects of the common mode noise on the data signals are reduced by using measurement of a data signal current before the data signal current mixes with a common mode noise current.

15. The system as recited in claim 14, wherein the effects of the common mode noise on the data signals are reduced by routing the three-phase wires of the three-phase power cable through a single current transducer whose output is connected to a plurality of filters.

16. The system as recited in claim 14, wherein the effects of the common mode noise on the data signals are reduced by installing three current transducers with each current transducer dedicated to a corresponding phase.

17. A method, comprising:
    powering an electric motor of a downhole electric submersible pumping system via three-phase power delivered downhole via a power cable coupled with a surface power source;
    using a telemetry system to convey data signals along the power cable from a downhole sensor unit to a surface receiver; and
    using a common mode filter in combination with a step-up transformer along the power cable to reduce corruption of the data signals by reducing both differential mode noise and common mode noise associated with transmitting electric power from the surface power source and through the power cable to the electric motor.

18. The method as recited in claim 17, wherein reducing comprises using a toroidal core to reduce the common mode noise.

* * * * *